Jan. 7, 1936. T. A. BENNETT 2,026,607
ASTIGMOMETER
Filed Oct. 30, 1933 2 Sheets-Sheet 1
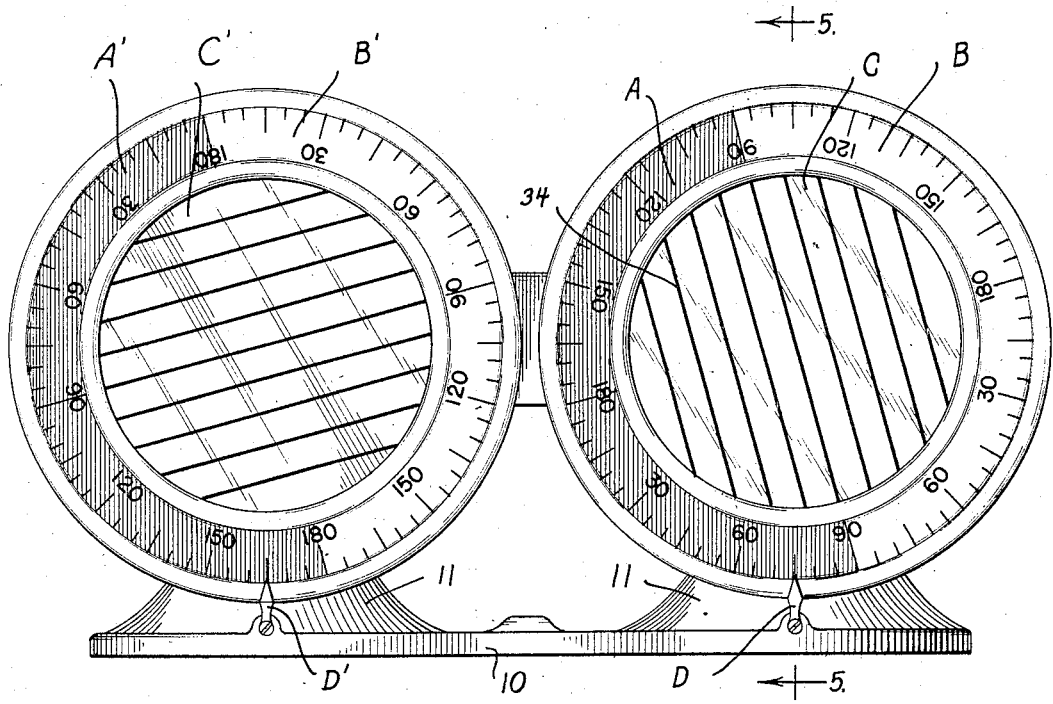
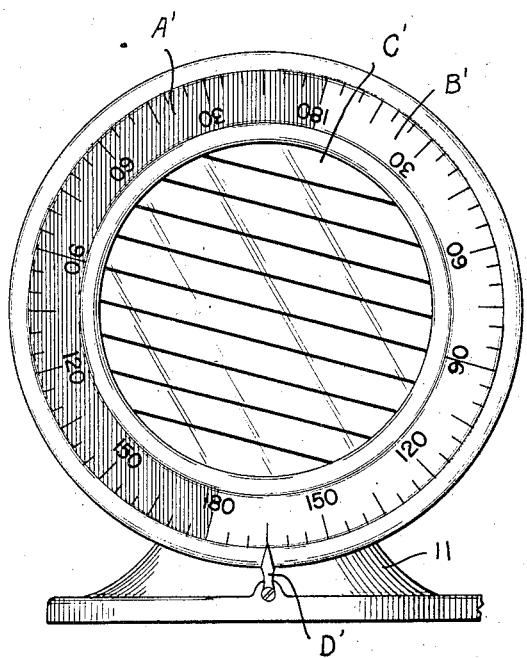
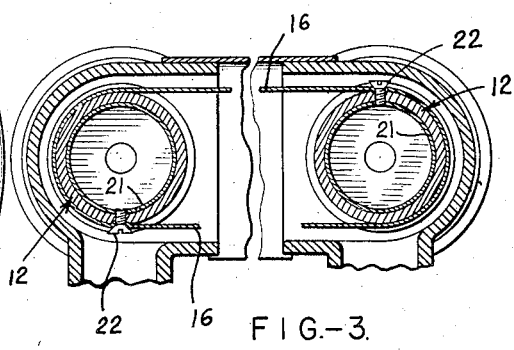
INVENTOR:
THEODORE A. BENNETT
BY Cox + Moore
ATT'YS.

Jan. 7, 1936.   T. A. BENNETT   2,026,607
ASTIGMOMETER
Filed Oct. 30, 1933   2 Sheets-Sheet 2
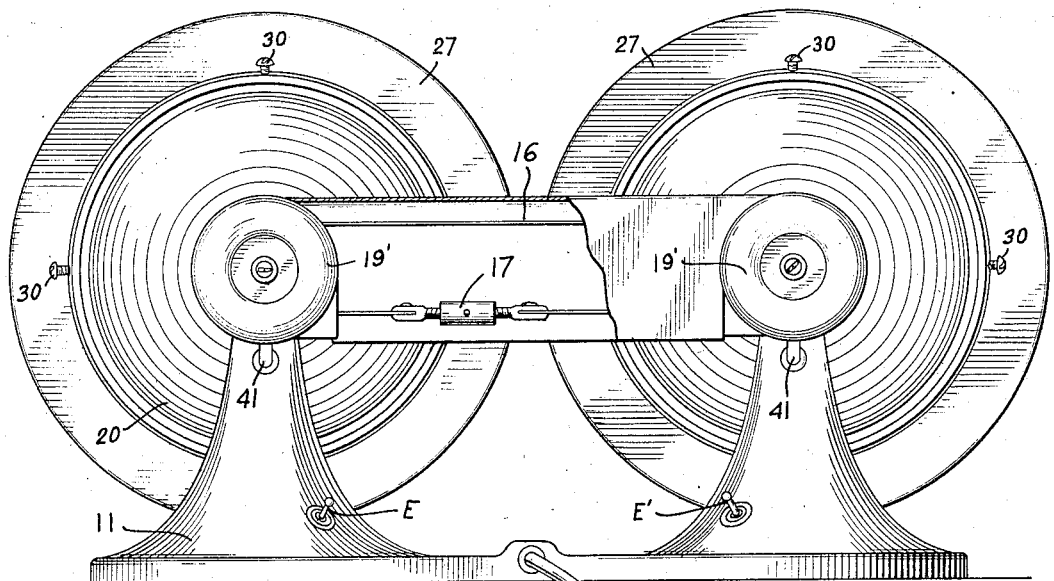
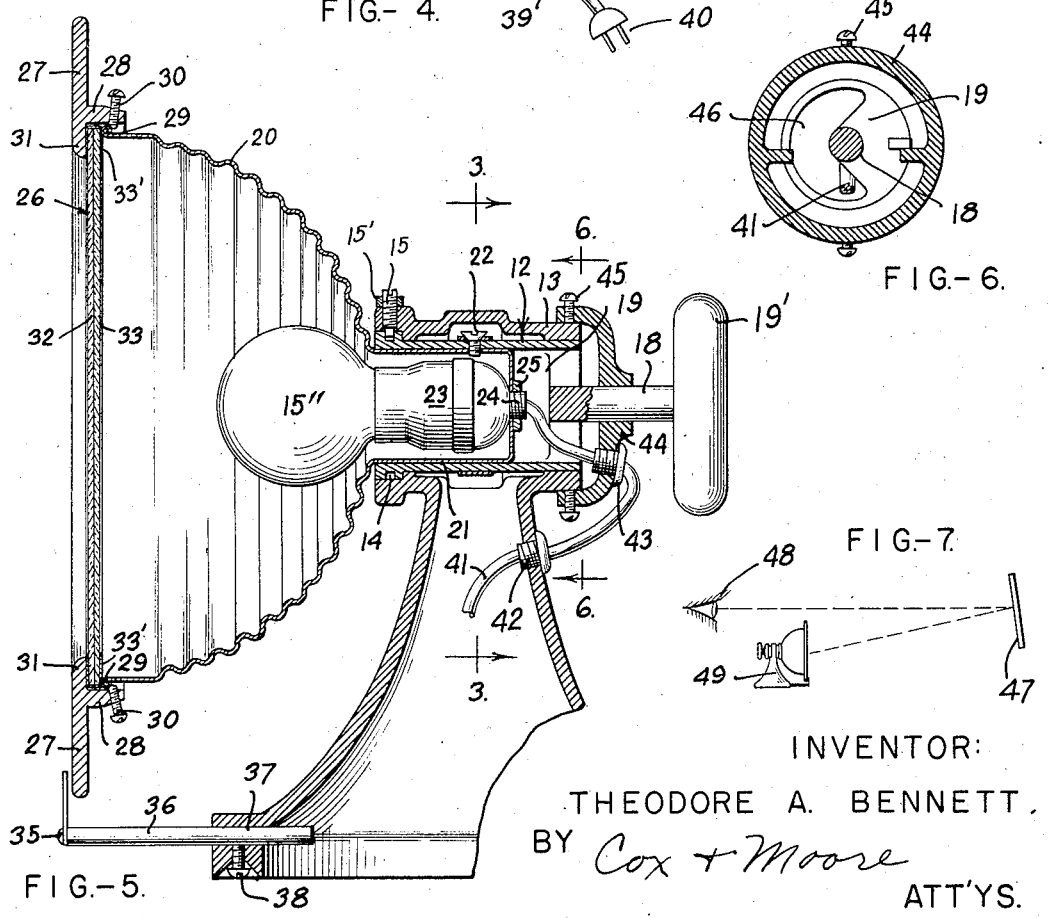
INVENTOR:
THEODORE A. BENNETT,
BY Cox + Moore
ATT'YS.

Patented Jan. 7, 1936

2,026,607

UNITED STATES PATENT OFFICE 2,026,607

ASTIGMOMETER

Theodore A. Bennett, Chicago, Ill.

Application October 30, 1933, Serial No. 695,744

3 Claims. (Cl. 88—20)

The present invention relates to an astigmometer used by eye examiners for determining whether a patient has astigmatism, how much the astigmatism is, and the amount of correction necessary to make the patient's vision as nearly normal as possible. It is also used for the purpose of determining the cylindrical power of the lens required to correct the astigmatism.

One object of this invention is to provide a means and method for quickly and accurately locating the ametropic correction necessary for an eye.

Another object of this invention is to provide means for locating the primary and secondary principal meridians of the patient's eye, which is necessary in order to construct a lens to correct the astigmatism.

Another object of this invention is to provide a simple method and mechanism for determining the amount of correction necessary in conjunction with standard test lenses.

Another object of this invention is to provide an instrument for quickly checking a patient's old lenses while the same are being worn, for the determination of possible errors in the positions of the axes of the lenses or in the "cylinder correction".

Another object of this invention is to provide a simple mechanism which can be operated by the patient himself for determining the primary and secondary principal meridians of the eye.

Another object of this invention is to provide an instrument having suitable charts which may be viewed either directly by the patient or in a mirror and including associated instrumentalities providing suitable angular indicating means for compensating for the reversed image of the chart viewed in the mirror by the patient, so that whichever way the chart is used, the correct angles will be indicated. This aspect of the invention includes an arrangement whereby the axes are indicated directly in degrees, regardless of whether the instrument is used with a mirror or is viewed directly by the patient.

Another object of this invention is to provide a new and improved method for determining the primary and secondary principal meridians of the eye.

Another object of this invention is to provide an improved method and apparatus for determining the primary and secondary principal meridians in a quicker and more accurate manner than is possible with other instruments in use at the present time.

Another object of this invention is to provide means for determining the primary principal meridian of the eye first and in a manner that the secondary principal meridian is determined automatically and consecutively, whereby the patient is not subjected to a confusing test for both axes simultaneously, or even successively.

Another object of this invention is to determine more accurately the primary and secondary principal meridians by providing the instrument preferably with suitable black parallel lines, which are rather narrow as compared with prior practice, and which are spaced apart considerably in proportion to their width, with the spaces therebetween being white or of a contrasting shade or color, so that the preponderance of the chart used will appear to be white or of the contrasting shade or color used, thereby enabling the determination of the meridians quickly and accurately, due to the fact that the position of the lines when in alignment with the primary principal meridian will appear real black, and any slight deviation therefrom produces a blur readily and immediately observable by the patient.

Another object of this invention is to produce a simple, efficient mechanism for the purposes set forth and provide in connection therewith certain novel elements which make the device simple, durable, and efficient.

Other objects of this invention will appear hereinafter as the description of this invention proceeds, the novel features, arrangements and combinations being clearly set forth in the appended claims.

In the drawings:

Fig. 1 is a front elevational view of a device embodying my invention, showing the position of the parts when the device is to be viewed directly by the patient;

Fig. 2 is a fragmentary front elevational view of the left half of the instrument shown in Fig. 1 with the parts in another position of adjustment.

Fig. 3 is a cross-sectional view taken on the line 3—3 of Fig. 5;

Fig. 4 is a rear elevational view of the instrument with parts broken away for the sake of clearness;

Fig. 5 is a vertical cross-sectional view taken on the line 5—5 of Fig. 1;

Fig. 6 is a cross-sectional view taken substantially along the line 6—6 of Fig. 5.

Fig. 7 is a schematic view illustrating the manner in which this instrument is used with a mirror.

A discussion of what constitutes astigmatism is not necessary here, as it is well known in the art; sufficient to say, that in correcting for astigmatism, one must first find the primary and secondary principal meridians of the eye. With known methods, this primary principal meridian is very difficult to determine exactly or within very narrow limits, because some tests are so complicated that they do not enable the patient (who is the judge) to determine at what exact angle certain lines appear blackest to him, thus establishing the position of the primary principal meridians, and unless the patient can determine just what lines at various angles appear blackest to him or at what angle certain lines appear blackest to him, it is impossible for the optometrist to determine the primary principal meridian with any degree of accuracy. Some of the difficulties which the patient experiences in trying to determine at what position certain lines appear darkest to him arise from the fact that his attention is directed to more than one visual object at the same time, and he cannot fully concentrate on what he is doing as well as when his mind is concentrated only on one thing at a time. Other known methods are not sufficiently accurate to give good results, and the impressions which the charts are supposed to impart to the patient's eye are not sufficiently definite to enable the patient to describe them accurately, with the result that frequently the patient becomes confused and describes what he sees as being different from the impression that he should receive. For instance, some of the impressions which the patient's eye is supposed to receive are described by the optometrist as being "checker-board", "honey-combed", "stair effect", and the like. The patient, however, may be trying to describe a condition between a true "checker-board" effect and a "honey-comb" effect. This often results in the location of the improper primary meridian of the eye. Thus, he is not able to fit the patient with the proper glasses for his astigmatism. However, by using as I do, the lines which are very narrow with wide intervening light spaces, the patient is better able to determine at just what angle the lines appear to be blackest to the eye.

Referring now to a detailed description of the invention, in the drawings, the reference character 10 indicates the base of the instrument which has identical upstanding pedestals 11 formed integral therewith, and, as clearly indicated in Fig. 6, each of these pedestals is provided with a bushing 12 rotatable within a bearing 13, at the top thereof. I will describe only one of these pedestals and the mechanism supported thereby, as the details of both are identical, except for slight differences which will be pointed out hereinafter. The bushing 12 is provided with a peripheral groove 14, and a set screw 15, threaded through the bearing, has the end thereof extending into this groove to prevent longitudinal movement of the bushing. Lock nut 15' holds the screw in adjusted position. However, the bushing can rotate freely on its axis through at least 180 degrees. The bushings are connected by means of a flexible band 16, the ends of which are connected by a turn buckle 17, which is used to tighten the band. The band is preferably made of flexible metal, but can be made of fabric or any other desired material. Also, instead of using a flat, endless band of metal such as shown, I can use a flexible chain, gearing or the like. The purpose of the connection between the two bushings 12 is merely to impart to these bushings equal amounts of rotative movement so that when one of the bushings is rotated by means presently to be described, the other bushing will also rotate.

The bushing 12 is provided with a stem 18, integral with or secured to a web portion 19, the axis of the stem 18 being concentric with the axis of the bushing 12. The stem carries a hand wheel 19', which can be manipulated to rotate the stem and bushing, and is secured thereto in any desired manner.

Each of the bushings 12 supports a reflector 20 which has cylindrical portions 21 thereof forced into the bore of the bushing so that the reflectors will rotate with the bushing. The flexible band 16 is secured to each of the bushings 12 by means of screws 22, which, from an inspection of Fig. 3 are threaded into the bushings in such a manner that at least 180 degrees of rotation may be imparted to the bushings. While the press fit of the cylindrical portions 21 of the reflectors in the bushings is sufficient to ordinarily hold the cylindrical portion and bushing against relative rotation, nevertheless, it is preferred that the screws 22 extend through the bushings, and also through the reflectors, as is clearly illustrated in Fig. 5, to positively prevent such relative movement.

Within each of the cylindrical portions 21, there is provided a lamp socket 23, suitably secured within the cylindrical portion as by means of the hollow threaded portion 24 on the socket, and the nut 25. An ordinary incandescent bulb is screwed into the socket 23, and the rays of light are reflected by the reflector through a translucent chart 26, secured over the opening in the front of the reflector. The construction of this chart will be described later. Each reflector has secured thereto an annular flat disc portion 27, on which there are suitable graduations also to be described later. The annular disc 27 has a flange 28 embracing the peripheral bead 29 on the reflector and set screws 30 arranged peripherally about the flange 28, engage the rear side of the bead 29 and hold the disc portion 27 on the reflector as well as exert a camming effect which draws the disc portion 27 inwardly toward the reflector to clamp the chart 26 between the portion 31 of the disc 27 and the bead 29, on the reflector.

The chart 26 is made of 2 flat glass discs 32 and 33, the former being preferably clear glass with opaque lines 34 painted, etched and then painted or otherwise placed thereon, on the side opposed to disc 33, and the disc 33 is opalescent to diffuse the light from the bulb 15'' as it passes through the chart. The lines 34 are preferably about $\frac{3}{32}$'' in width and spaced about ½'' to ¾'' apart. I have found that such widths and spacing give excellent results. Of course, the positions of the black lines between the discs is only the preferred position, for it is obvious that the lines could be elsewhere than as indicated, but in the preferred positions the lines are protected and will not lose their blackness as they might if exposed and subject to contact by cleaning cloths or the like which may be used to clean the instrument. The edges of the discs 32 and 33 are held together by a peripherally extending band 33', preferably of yielding or adhesive material to prevent their separation and to exclude dust therefrom. The clamping effect of screws 30 also assists in holding these plates together.

With this arrangement, whenever the bushings are rotated by actuating one of the hand wheels 19' the charts, reflectors, and discs 27 rotate in unison and since the latter are set in fixed relation to the lines on the charts, the same are marked or graduated to indicate the angles of the lines 34 with respect to a given zero position (in this case a horizontal line) from which the optometrist works. These graduations are divided into two sets on each disc. The shaded areas of discs 27 are herein designated as scales A and A'. The unshaded areas are designated B and B' with scales A and B arranged about chart C and scales A' and B' arranged about chart C'. Each scale indicates angles up to 180°.

Pointers D and D' are adapted to cooperate with scales A and A' when said scales are being used in testing the patient by having him view the charts directly, whereas pointers D and D' cooperate with scales B and B' when said scales are being used in testing the patient by having him view the charts in a mirror. Since the bushings 12 have only 180° of rotation only one set of scales A—A' or B—B' can be used at one time and when the other set of scales are to be used the screws 30 are loosened and the discs 27 rotated 180° relative to the reflectors whereafter the screws are again tightened and the other sets of scales are in position to be used with pointers D and D'. Gears could be used such that bushings 12 would have 360° of rotation, but while this would eliminate shifting the charts and discs through 180° in the manner set forth, the operator might use the wrong set of scales when testing the patient and gross inaccuracies would result, whereas with the described arrangement, this will not happen, and generally one setting is enough, as the optometrist either uses one or the other methods of testing exclusively, or at least only changes in rare cases. Thus when once set the optometrist is prevented from incorrectly reading the true primary meridian of the eye after the chart is set during the tests.

The scales A, A', B, and B' are so graduated that they read directly the angles of the primary and secondary meridians of the eye measured in a clockwise direction from the horizontal, when the lines 34 on chart C are at the angle where the same appear darkest to the patient.

The pointers D and D' are secured by screws 35 to the ends of rods 36 which in turn extend through openings 37 in the base and are held therein by screws 38.

An electric cord 39 having a plug 40 thereon to be connected to a socket in a light circuit, extends into the base 10 and has branches 41 which extend upwardly through pedestals 11, then out of same through insulating bushings 42, next into bushings 12 through insulating bushings 43 in caps 44, which are secured over the ends of the bearings 13 by screws 45, and finally into lamp sockets 23 to suitable terminals therein. In Fig. 6 it will be noted that due to the large space 46 provided by having the web 19 extend considerably less than 180°, the cord extension 41 is not engaged by the webs and thus the life of the cords is lengthened, as the bushings 12 have only 180° of rotation or perhaps rotation just slightly in excess thereof.

Independent switches E and E' are used to send the current to the bulbs 15'' behind the respective charts C and C' so that either or both can be illuminated as desired.

I will now describe the operation of my device as used in practice. First I will describe the direct method, which is the one where the patient sits in front of the instrument generally at the prescribed distance of 20 feet.

Each eye is examined separately. The charts are set to use scales A and A'. The patient sits erect with his eye focused on chart C, which is the only one which is illuminated at first. The strongest plus spherical lens or the weakest minus spherical lens that he can have and still distinguish the lines on the chart in one position of the chart only, is then placed between the eye of the patient and the chart. This proves the presence of astigmatism, as otherwise the lines would appear equally black in all positions of the chart.

To determine the exact axis of astigmatism, the optometrist rotates the chart C slowly to each side of the position where the lines appear blackest and the patient is then instructed to tell when the lines begin to blur. The angular positions where blur occurs are noted on scale A at pointer D and then the scale is moved to the position equidistant from the two positions where the lines begin to blur. This is the primary principal meridian and the axis of the plus cylinder lens. The other chart C' is then illuminated and if the system has been properly applied the lines on the second chart C' will be blurred, because the second chart automatically assumes a position establishing the secondary principal meridian and the axis of the minus cylinder lens. The optometrist next proceeds to equalize the lines on both charts in clearness and blackness by suitable cylinder lenses, always using a minus cylinder lens with axis set at the secondary principal meridian of the eye. The amount of cylinder lens power necessary to equalize the lines on both the charts in clearness and blackness is the amount of the astigmatism. The lens or combination of lenses now found before the eye should be the approximate ametropic correction. The power of the spherical lens should only be varied if necessary to improve the acuity of the eye. This is repeated for the other eye and glasses fitted accordingly.

To use this device with a mirror, or by the indirect method, the patient sits behind the instrument looking over the same into a mirror 47 (see Fig. 7) in which are reflected the images of the charts, the position of the eye being indicated at 48 and the instrument being indicated generally at 49. In this position the patient can turn the hand wheels 19' himself and thus stop rotation of the charts more readily at the positions where the lines are blackest or begin to be blurred. The optometrist notes the angles on the charts B and B' which are used with this method and locates the meridians as before. The scales B and B' are arranged to compensate for the changed angles of the lines reflected so that the angles read on scales are angles of the lines as they appear in the mirror.

In Fig. 1 the scales A and A' are being used for direct use of the instrument, that is, the charts are to be viewed directly by the patient, while in Fig. 2 the scales B and B' are being used, disc 27 having been rotated 180° relative to the reflector from its position in Fig. 1. If the lines 34 as shown in Fig. 2 are reflected in a mirror, it is obvious that their appearance to the patient will be the same as the lines on this chart in Fig. 1. Therefore, the pointer D' should indicate the same angle on scale B' in Fig. 2 that it does on scale A' in Fig. 1, which it does, as will be seen from an inspection of these figures.

This instrument can be used for other purposes, such as for locating the axis of a lens, and for doing this the indirect method is used. The person making the test must have his eyes free from astigmatism, or have any astigmatism therein corrected for, before this test can be properly made. The spherical power of the lens is neutralized to leave a cylinder of plus denomination. The lens is held in the same position which it would occupy when in front of the patient's eye. The chart is then rotated to the position where the lines are clearest, and this will be the axis of 90° from axis of the plus cylinder under observation. The axis of the cylinder being checked will be indicated on scale of chart not lighted. The instrument can also be used in this manner to check the glasses which the patient is wearing, to see if they are what he should be wearing.

This instrument is very efficient, since the charts show a preponderance of white which merges more quickly with the black to produce noticeable blurs, than with other instruments; it is simple, yet speedy, as only one chart is used to check the eye for one meridian and the other meridian is determined automatically; there are no lines except in one meridian; and the patient can operate the instrument himself.

If desired, two pointers can be used for each chart one with scale A or A' and the other for B or B'. These would be situated 180° from each other and suitably graduated to indicate the proper angles of the lines on the charts. This arrangement is not as satisfactory as that shown, for, while it does away with moving the charts angularly when one wishes to change from one method of testing to the other, the optometrist is apt to read the wrong pointer and as a result get the wrong angles of the principal meridians, or the two scales and cooperating means therefor could be otherwise arranged conveniently, but that arrangement shown is preferred.

Those skilled in the art to which this invention pertains may make other changes in the construction or arrangement of parts without departing from the spirit of this invention or the scope of the appended claims, and therefore I do not wish to be limited except as set forth in the appended claims.

Having thus fully described one embodiment of my invention, what I claim and desire to secure by Letters Patent of the United States is:

1. An astigmometer comprising a pedestal having a bearing thereon, a bushing journalled in said bearing for rotative movement, a reflector carried by said bushing rotatable therewith, and having an open side, illuminating means within said reflector, a transparent chart arranged over said open side, and indicating means for indicating the angular position of said chart.

2. An astigmometer comprising a pedestal having a bearing thereon, a bushing journalled in said bearing for rotative movement, a reflector carried by said bushing rotatable therewith, and having an open side, illuminating means within said reflector, a transparent chart arranged over said open side, and indicating means for indicating the angular position of said chart, said chart having a series of narrow dark parallel lines thereon spaced apart a distance substantially greater than their width, the spaces between said lines being contrasted thereto by being lighter than said lines.

3. An astigmometer of the class described, comprising a rotatable hollow bushing carrying a reflector and a transparent illuminated chart, a source of light within said reflector for illuminating said chart and rotatable therewith, a stationary cap over the end of said rotatable bushing, an operating member for rotating said bushing extending therethrough in alignment with the axis of said bushing and connected to the inside thereof by a web which leaves a clear space of at least 180° adjacent said web and peripherally of said bushing, whereby a light cord may extend through said cap to said source of light, past said web, without being engaged by said web during the rotation of said bushing.

THEODORE A. BENNETT.